Oct. 12, 1948.                    R. POTTER                     2,450,987
                HANDLING AND JOINING COOPERATING MEMBERS
Filed Feb. 19, 1942                                       8 Sheets-Sheet 1

INVENTOR
*Robert Potter*

Oct. 12, 1948.  R. POTTER  2,450,987
HANDLING AND JOINING COOPERATING MEMBERS
Filed Feb. 19, 1942  8 Sheets-Sheet 3

INVENTOR
Robert Potter

Oct. 12, 1948.  R. POTTER  2,450,987
HANDLING AND JOINING COOPERATING MEMBERS
Filed Feb. 19, 1942  8 Sheets-Sheet 4

INVENTOR
Robert Potter

Oct. 12, 1948.   R. POTTER   2,450,987
HANDLING AND JOINING COOPERATING MEMBERS
Filed Feb. 19, 1942   8 Sheets-Sheet 7

INVENTOR
Robert Potter

Patented Oct. 12, 1948

2,450,987

UNITED STATES PATENT OFFICE 2,450,987

HANDLING AND JOINING COOPERATING MEMBERS

Robert Potter, Mount Lebanon, Pa., assignor to Superior Steel Corporation, Pittsburgh, Pa., a corporation of Virginia Application February 19, 1942, Serial No. 431,595

11 Claims. (Cl. 153—1)

This invention relates to handling and joining articles. It relates more particularly to handling and joining metal members and has particular utility in the fabrication of bimetallic billets. The invention has to do with a process of handling and joining articles and particularly metal members and to apparatus for a like purpose.

While the invention in its broadest aspects is not limited thereto, because the invention has particular utility in the fabrication of bimetallic billets it will be described in relation to such fabrication. Bimetallic billets are employed for making bimetal in sheet or strip form, which bimetal has many uses, that which is at present most important being the fabrication of ammunition components such as bullet jackets and cartridge cases.

For purposes of explanation and illustration I shall describe my novel process and apparatus in connection with the making of bimetallic billets of steel and gilding metal. The steel may be an ordinary carbon steel and the gilding metal may be composed of in the neighborhood of 90% copper and in the neighborhood of 10% zinc. A bimetallic billet may be made by applying to a steel backing either one facing of gilding metal or two facings of gilding metal applied to opposite faces of the steel backing. Whether one or two facings of gilding metal be applied to the steel backing, it is desirable to provide the steel backing with flanges for holding the facing or facings thereto. I shall describe the formation of a bimetallic billet by applying two opposed facings of gilding metal to a backing of steel, it being understood that the invention in certain of its aspects is equally applicable to the making of a bimetallic billet in which but a single facing is applied to a backing.

I provide a steel backing of generally billet form but having a pair of opposed longitudinally extending flanges projecting therefrom at the lateral boundaries of each broad face of the billet. A facing is adapted to be laid against each of the faces of the billet bounded by said flanges so as to lie between the flanges or, in other words, so as to lie in a channel formed by a face of the billet as the base of the channel and two opposed flanges as the sides of the channel. It is then desirable to deform the flanges inwardly against the respective facings to hold the facings tightly against the backing.

It has heretofore been proposed to form a bimetallic billet of the general type above referred to. However, difficulty has been encountered in holding the facing or facings to the backing. I have found that it is desirable in deforming the flanges of the backing against the facing or facings to hold the facing or facings flat against the backing so as to prevent bowing and ingress of air and to deform the flanges while so holding the facing or facings. I have found that this can be ideally accomplished by rolling the assembled members together. I preferably advance the assembled members together and while advancing them continuously pein over the flanges of the backing to hold the facing or facings firmly in place thereagainst. Preferably while so peining the flanges I press the facing or facings tightly against the backing by holding rolls or roll portions. I preferably employ peining rolls having inclined peining portions for deforming the flanges and pressing the metal of the flanges against the edges of the facings and also having portions for pressing together the backing and facing members intermediate the flanges. I prefer to employ as portions of the peining rolls resilient pressing bands which may desirably be formed of rubber or rubber-like or other resilient material. I also prefer to employ in connection with the peining rolls guiding and pressing rolls for insuring proper presentation of the work to the peining rolls.

I also provide for easily assembling the billet components in proper cooperative relationship and advancing them to the peining rolls. I preferably provide means for more or less automatically positioning one or both facings relatively to the backing and maintaining the same in proper position during advance and during the peining step. I preferably push the work toward the peining rolls and provide a stop against which the forward ends of the backing and facing members may abut to properly relatively position them before pushing them between the peining rolls. I preferably provide means insuring retraction of the stop to inoperative position when the work is pushed forward to the rolls. I also preferably provide improved means for handling the billet components and inspecting the same as they approach the peining station.

The power for moving the work through the peining rolls may be applied by the rolls themselves or by means pushing the work through the rolls or otherwise. I prefer to drive at least one and desirably both of the peining rolls and to employ idler guide rolls between which the work passes on its way to the peining rolls. I preferably positively push the work forward between the idler rolls until it is engaged by the bite of the peining rolls when it is advanced by the driven peining roll or rolls and peined by the peining rolls, the pushing means becoming inoperative as soon as the work is taken by the peining rolls. I find that by the use of a process and apparatus of the type mentioned I obtain highly satisfactory and uniform results and can fabricate bimetallic billets with great efficiency and economy.

Other details, objects and advantages of the invention will become apparent as the following description of certain present preferred embodiments thereof and certain present preferred methods of practicing the same proceeds.

In the accompanying drawings I have shown certain present preferred embodiments of the invention and have illustrated certain present preferred methods of practicing the same, in which.

Figure 8:
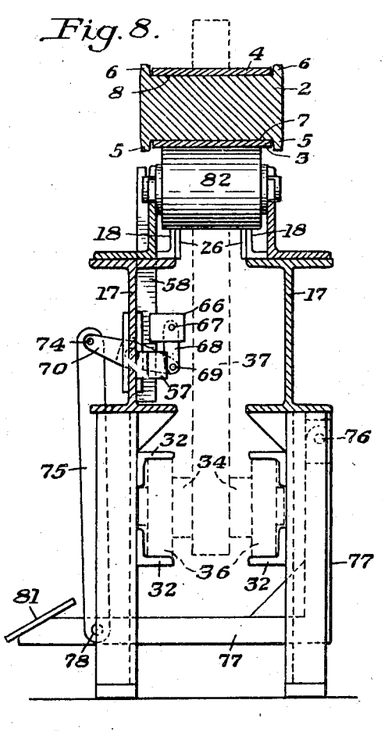
Figure 8 is a vertical transverse cross-sectional view to enlarged scale taken on the line VIII—VIII of Figure 4 and showing work in place in the apparatus.

Referring now more particularly to the drawings, there is shown apparatus for handling and joining metal members in fabrication of bimetallic billets. Each bimetallic billet fabricated by the particular form of apparatus shown preferably comprises a steel backing member having opposed flanges projecting from opposite faces thereof as shown, for example, in Figure 8, and two gilding metal facing members adapted to lie respectively against such faces of the backing member and to be held thereto by the flanges of the backing member. The apparatus shown is for assembling the backing member and facing members in proper cooperative relationship and fastening them together.

The flanged steel backing member is designated by reference numeral 2. The gilding metal facing member applied to the lower face of the backing member is designated by reference numeral 3. The gilding metal facing member applied to the upper face of the backing member is designated by reference numeral 4. The opposed lower flanges of the backing member are designated 5 and the opposed upper flanges of such member are designated 6. The downwardly facing surface of the backing member against which the facing member 3 lies is designated 7 and the upwardly facing surface of the backing member against which the facing member 4 lies is designated 8. Thus the member 3 lies in a channel formed by the surface 7 and the inner surfaces of the flanges 5 while the member 4 lies in a channel formed by the surface 8 and the inner surfaces of the flanges 6.

Preferably the member 2 is somewhat longer than the members 3 and 4. Preferably each of the members 3 and 4 is somewhat narrower than the transverse distance between the opposed flanges of the member 2 between which it is adapted to lie when the members are assembled so that the respective members may without difficulty be brought into proper cooperative relationship. The members 2, 3 and 4 are assembled by use of the apparatus shown and after assembly the flanges 5 and 6 of the backing member are deformed or peined over against the edges of the facing members to firmly hold the backing and facing members together and form a bimetallic billet ready for rolling.

Figure 1:
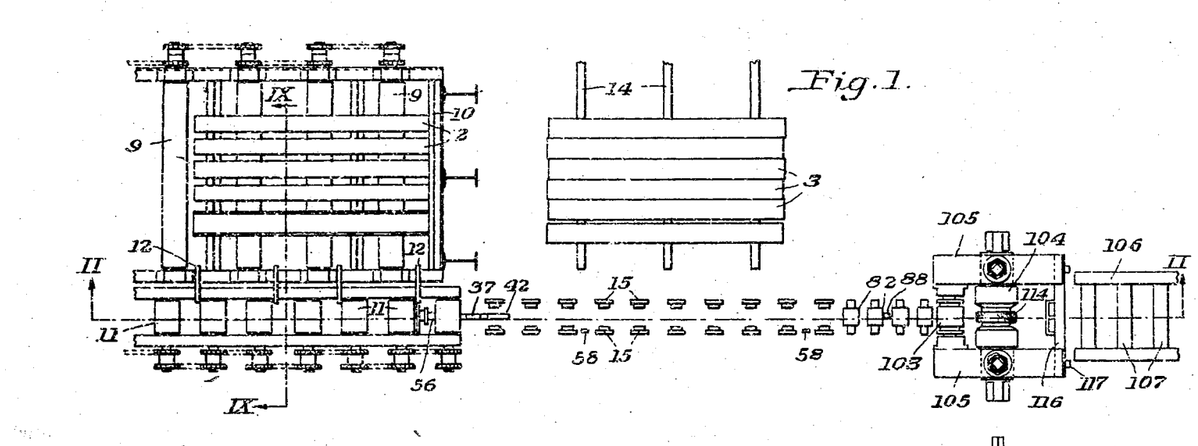
Figure 1 is a plan view, largely diagrammatic, of apparatus for handling and joining metal members to fabricate bimetallic billets.
Figure 2:
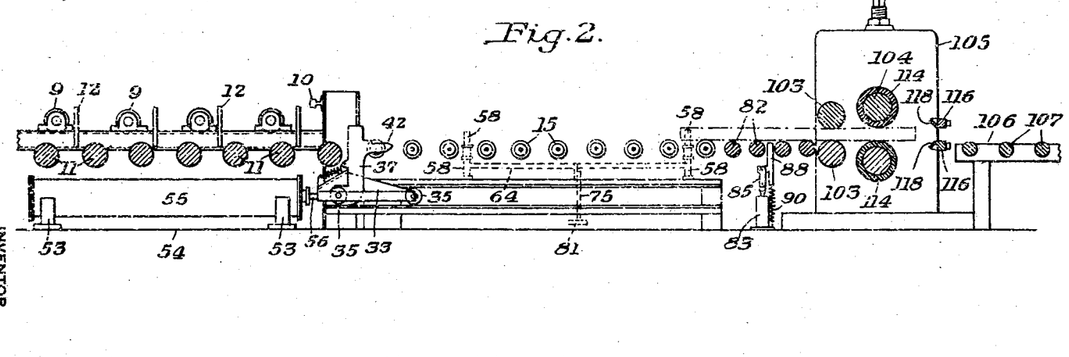
Figure 2 is a view partially in elevation and partially in vertical longitudinal cross section on the line II—II of Figure 1 of the apparatus shown in Figure 1.
Figure 9:
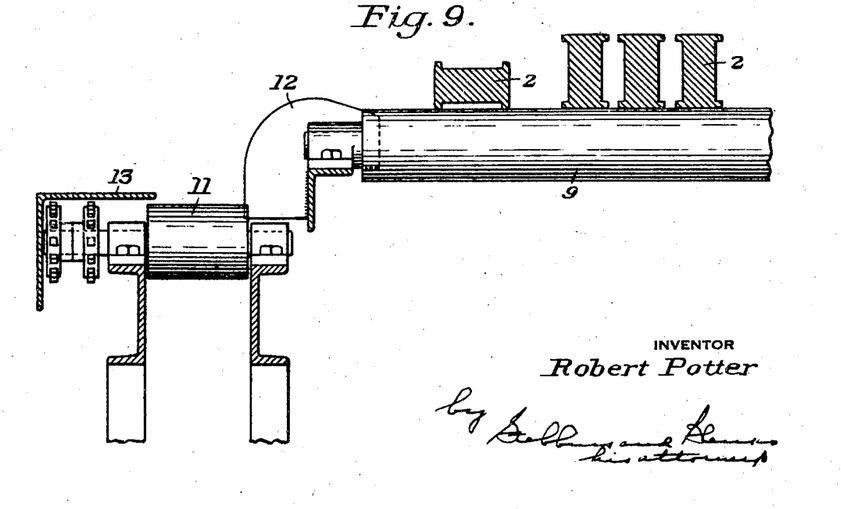
Figure 9 is a vertical transverse cross-sectional view to enlarged scale taken on the line IX—IX of Figure 1.

The packing members 2 are delivered to the joining apparatus by a roller table comprising rollers 9 (see Figures 1, 2 and 9). The backing members are advanced from left to right viewing Figures 1 and 2, preferably coming directly from pickling apparatus where they are pickled and cleaned so as to be free from dirt and scale. The backing members are advanced by the rollers 9 until the leading ends thereof strike against a stop 10. Usually a number of such members are advanced in substantially side by side relationship on the rollers 9 and the stop 10 is effective for accurately lining them up transversely of the apparatus as shown in Figure 1.

The members 2 are preferably delivered against the stop 10 in upright position as the three right-hand members 2 are shown in Figure 9. The members are then moved successively transversely of the direction of their advance on the rollers 9 and to the left viewing Figure 9 into position to be assembled with the facing members. The member 2 which is disposed farthest to the left, viewing Figure 9, on the rollers 9 is preferably turned on its side by hand or by a suitable tool or hook held by a workman until it rests upon two of its flanges as the left-hand member is shown in Figure 9. In this position the face which was toward the right is now uppermost and may be inspected. The face which was originally toward the left may be inspected either prior to turning the member as just described or after it reaches its succeeding position in which such face will be uppermost, as will presently appear.

There is provided a roller table comprising rollers 11 which is disposed beside the roller table comprising the rollers 9 but at a lower level. The table comprising the rollers 11 is narrower than that comprising the rollers 9 and is adapted to receive and convey one of the members 2 at a time. Disposed between the tables comprising the rollers 9 and 11, respectively, is a series of guide plates 12 whose shape is shown in Figure 9. As one of the backing members 2 is slid toward the left, viewing Figure 9, from its position resting upon two flanges upon the rollers 9 it moves slightly upwardly as it engages the guide members 12, whereby it is removed from the rollers 9, and then is permitted to slide down upon the curved left-hand faces of the guide members 12 and come to rest on the rollers 11. The member 2 may turn over in settling on the rollers 11 so that the flanges which are uppermost when it lies on the rollers 9 are lowermost when it lies on the rollers 11, or if this does not occur without assistance from the operator it is a simple matter for the operator to exert slight pressure on the member as it falls upon the rollers 11 to insure that it will lie upon such rollers with the flanges downward which were uppermost when it lay upon the rollers 9. Thus ample opportunity for inspection of all portions of each of the members 2 is afforded from the time such members are delivered against the stop 10 until each of them is conveyed away upon the rolls 11 as will now be described. A guide 13 cooperates with the members 12 to maintain on the rollers 11 the member 2 delivered thereto as just described.

Figure 3:
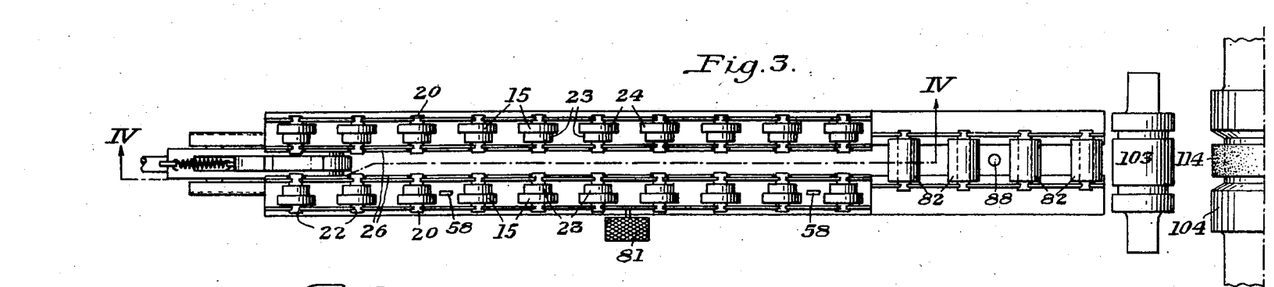
Figure 3 is a plan view to enlarged scale of a portion of the structure shown in Figure 1 and including structural details omitted in the largely diagrammatic showing of Figure 1.
Figure 4:
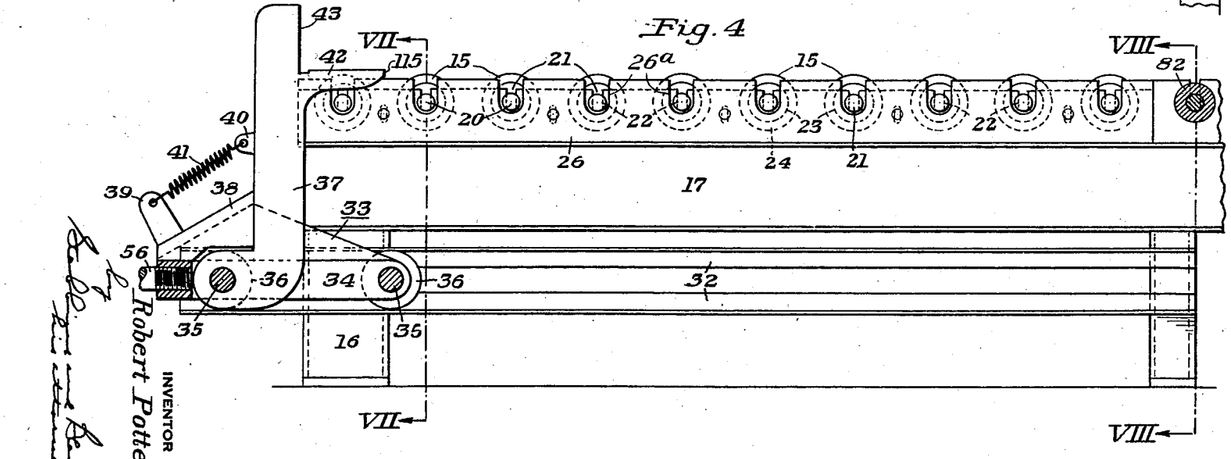
Figure 4 is a vertical longitudinal cross-sectional view to enlarged scale of a portion of the structure shown in Figure 3 taken on the line IV—IV of that figure.

There is provided a support 14 for facing members which are designated by reference numeral 3 in Figure 1. Since the facing members 3 and 4 are identical each facing member designated 3 in Figure 1 may be applied either to the bottom or to the top of a backing member 2. The facing members are ordinarily of sufficiently light weight that one of them can be handled by one man or, in any event, by two men. There is provided a roller table best shown in plan in Figure 3 which comprises idler rollers 15, the table comprising the rollers 15 being disposed immediately in front of the support 14 as shown in Figure 1. The roller table comprising the rollers 15 is also shown in elevation in Figure 4 and in transverse cross section in Figures 7 and 11. Such table is supported by a base 16 which carries spaced I-beams 17. Each I-beam 17 carries on its top opposed angles, an inner angle 18 and an outer angle 19. Each of the angles 18 and 19 has one flange resting upon the upper flange of its supporting I-beam 17 and the other flange projecting upwardly. The upwardly projecting flanges of the angles 18 and 19 serve as supports for the rollers 15. Each roller 15 is journaled for free rotation upon a pin 20. The upwardly projecting flanges of the angles 18 and 19 are slotted at 21 as shown in Figure 4, the slots being in transversely aligned pairs. Each of the pins 20 has vertical slots 22 in its side faces so that when it is introduced into a pair of transversely aligned slots 21 in the angles it will be held by interengagement of the edges of the slots 21 and 22. Thus the rollers 15 are mounted on the pins 20 in fixed positions.

Figures 10, 11, 12, 13, 14, 15, 16:
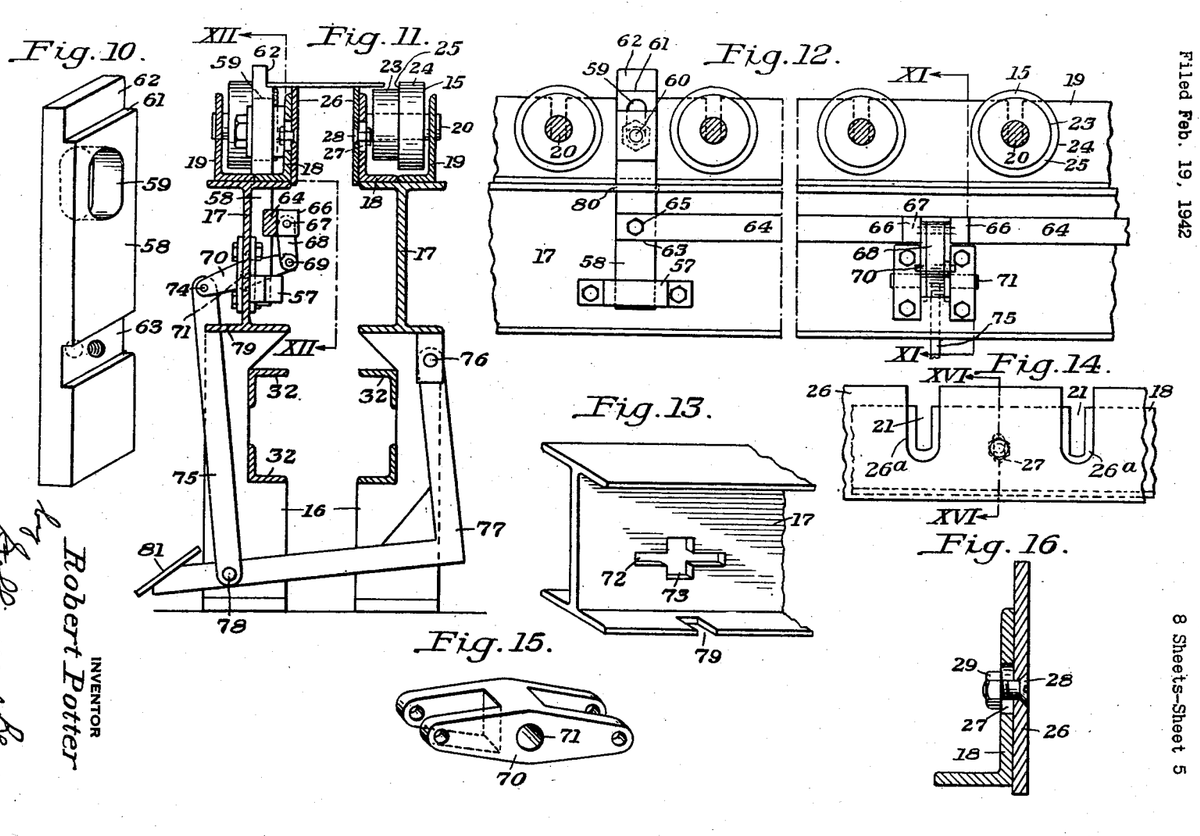
Figure 10 is a detail perspective view of a work positioning member.
Figure 11 is a vertical transverse cross-sectional view through the apparatus showing a work positioning member as illustrated in Figure 10 and operating mechanism therefor, Figure 11 being taken on the line XI—XI of Figure 12.
Figure 12 is a fragmentary vertical longitudinal cross-sectional view taken on the line XII—XII of Figure 11.
Figure 13 is a fragmentary perspective detail view of a portion of the mounting mechanism.
Figure 14 is a fragmentary detail elevational view showing a portion of the structure.
Figure 15 is a perspective view of one of the members for operating the work positioning means.
Figure 16 is a vertical transverse cross-sectional view to enlarged scale taken on the line XVI—XVI of Figure 14.

Each of the rollers 15 has a portion 23 of relatively small diameter and a portion 24 of relatively great diameter, an annular shoulder 25 being formed therebetween. As will presently be seen, the shoulders 25 of the rollers 15 cooperatively perform a guiding function with respect to the work.

Connected with the inner face of the upwardly projecting flange of each of the angles 18 is a plate 26. The upwardly projecting flange of each of the angles 18 is provided at intervals with vertically elongated slots 27. Screws 28 pass through each plate 26 and through the respective slots 27 in the angle by which the plate is carried and nuts 29 are applied to the screws and screwed up against the outer face of the angle flange. Thus the plates 26 are held to the angles and may be vertically adjusted by reason of the vertical elongation of the slots 27. The plates 26 are at any given time arranged with their upper surfaces at the same elevation for a purpose which will presently appear. The plates 26 also have vertically elongated slots 26a (see Figure 4) wider than the slots 21 and in transverse alignment therewith to provide space for the ends of the pins 20.

Figure 7:
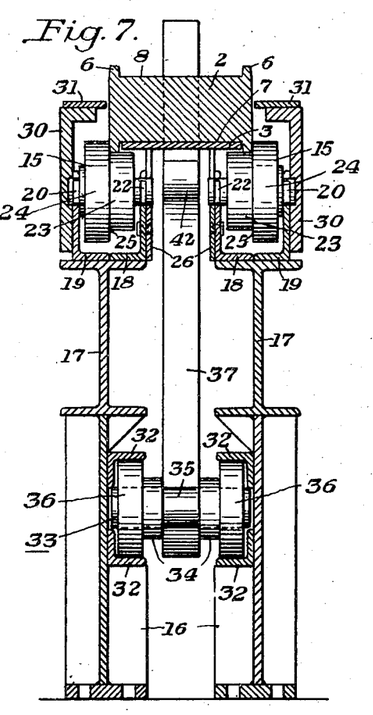
Figure 7 is a vertical transverse cross-sectional view to enlarged scale taken on the line VII—VII of Figure 4 and showing work in place in the apparatus.

Carried by the angles 19 and projecting upwardly therefrom are members 30 carrying inwardly projecting guides 31 as shown in Figure 7. The inner faces of the guides 31 are spaced slightly outwardly from the vertical planes containing the shoulders 25 of the opposed rows of rollers 15. The shoulders 25 of the opposed rows of rollers 15 are spaced apart a distance substantially equal to or very slightly greater than the distance between the outer faces of opposed flanges of the members 2 as shown in Figure 7.

The upper surfaces of the plates 26 are disposed at an elevation slightly higher than the tops of the roller portions 23 as shown in Figure 7. The plates 26 are adapted to support facing members 3 as shown in Figure 7 and as will presently be described.

The base 16 carries four longitudinally extending angles 32 (Figures 7, 8 and 11) forming a track for a carriage designated generally by reference numeral 33 (see Figures 2 and 4). The carriage 33 comprises opposed side members 34 carrying axles 35 which in turn carry wheels 36 adapted to ride in the track formed by the angles 32. The vertical spacing of the angles 32 is such as to allow clearance for rotation of the wheels 36 during movement of the carriage along the track but prevent substantial tilting of the carriage.

The rear axle 35 of the carriage 33 has pivoted thereto between the side members 34 a pusher 37. Integral with the carriage is a stop member 38 which when the pusher is in the position shown in Figure 4 prevents rotation thereof in the counterclockwise direction about the axis of the rear axle 35, viewing that figure, but permits clockwise rotation of the pusher. The carriage 33 also carries a projection 39 while the pusher carries a lug 40, and a tension coil spring 41 is engaged between the projection 39 and the lug 40 to urge the pusher back against the stop member 38 as shown in Figure 4.

The purpose of the pusher 37, as will presently appear, is to push the work into the bite of the peining rolls. The pusher extends upwardly between the I-beams 17 and between the plates 26 so that its upper portion is adapted to lie behind work carried by the rollers 15 to push such work toward the right, viewing Figures 1 to 4, inclusive. The upper portion of the pusher may assume various shapes as presently to be described or may present simply a vertical surface to push the work toward the right. In Figure 4 the pusher is shown as having a projection 42 carried by its upwardly projecting portion, the projection 42 extending generally horizontally when the pusher is in the position shown in Figure 4 and having its upper surface lying somewhat above the level of the upper surfaces of the plates 26 as shown. As will presently appear, the purpose of the projection 42 is to push the lower facing member 3 along the guideway comprising the rollers 15 in predetermined spaced relationship with respect to the backing member 2. In Figure 4 the face designated 43 of the pusher 37, which face lies above the projection 42, is adapted to engage the backing member 2 to push it along the guideway.

Figures 21, 23:
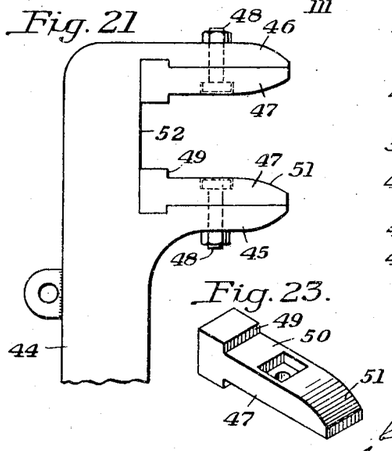
Figure 21 is a fragmentary elevational view of a modified form of pusher.
Figure 23 is a perspective view of a portion of the pusher shown in Figures 21 and 22.
Figure 22:
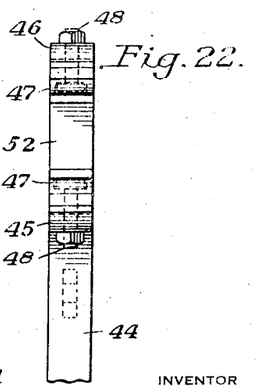
Figure 22 is an elevational view of the structure shown in Figure 21 as viewed from the right-hand side of Figure 21.

In Figures 21, 22 and 23 there is shown a modified form of pusher. In these figures the pusher is designated generally by reference numeral 44 and has two vertically spaced integral forward projections 45 and 46. Shoes 47 are adapted to be held against the inner faces of the projections 45 and 46 by bolts 48. Each shoe has a forwardly facing shoulder 49 and forwardly of the shoulder has a substantially plane surface portion 50 terminating in a curved or flaring surface portion 51. The heads of the bolts 48 are sunk within the shoes 47 as shown in Figure 21. The shoulders 49 are adapted to engage the facing members and the face 52 of the pusher between the shoes 47 is adapted to engage the backing member in pushing forward the assembled components of a bimetallic billet. The curved portions 51 of the shoes 47 are provided simply to insure ease of passage of the billet components into the space between such shoes.

Figures 24, 25:
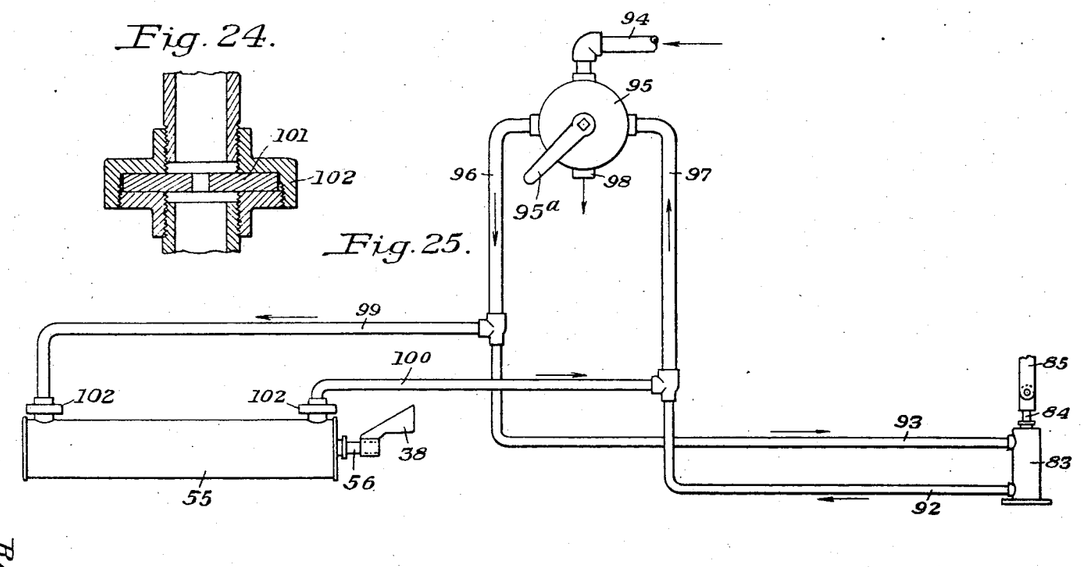
Figure 24 is a cross-sectional view through a piping connection of the hydraulic control system shown in Figure 25.
Figure 25 is a diagrammatic view of the hydraulic control system for the pusher and stop.

Mounted beneath the rollers 11 upon supports 53 carried by the floor 54 is a fluid pressure cylinder 55 (Figures 2 and 25) containing a piston to which is connected a piston rod 56 the outer end of which is connected to the carriage 33 as shown in Figure 4. Means as shown in Figure 25 and presently to be described but omitted in Figure 2 for the sake of clarity are provided for admitting fluid pressure either in front of or behind the piston in the cylinder 55 to move the same to the left or right, viewing Figure 2, as desired. Movement of the piston is accompanied by corresponding movement of the carriage 33.

Connected with the inner face of the left-hand I-beam 17, viewing Figure 11, is a pair of longitudinally spaced generally horizontally extending straps 57 (see also Figure 12) only one of which is shown in the drawings since such straps are uniform in structure and function. Each of the straps 57 serves as a guide for a positioning member 58 which is movable generally vertically therein. Each of the two positioning members 58 lies against the inner face of the web of the I-beam and the central portion of the corresponding strap 57 forms with the inner face of the I-beam a generally vertical guideway for the positioning member. Each positioning member 58 is provided with a vertically elongated slot 59 at its upper portion as shown in Figures 10 and 12. A guide bolt 60 passes through the upwardly projecting flange of the adjacent angle 18 and the plate 26 connected therewith and through the slot 59 of each of the positioning members 58 to serve in conjunction with the corresponding strap 57 to guide such positioning member for vertical movement. The upper extremity of each of the positioning members 58 is cut out to provide an upwardly facing shoulder 61 and an inwardly facing shoulder 62 as shown in Figure 10.

Each of the positioning members 58 has a cut-out portion 63 into which extends a longitudinally disposed bar 64 which is bolted to the positioning member by a bolt 65. There is only one such bar 64 and it is thus connected with one of the positioning members 58 at one end and with the other at the other end. At its center the bar 64 has a pair of opposed outwardly projecting ears 66 through which passes a pin 67. The pin 67 also passes through one end of a link 68. The other end of the link 68 is pivoted by a pin 69 to a rocking lever 70 which is pivoted on a pin 71 carried by the left-hand I-beam 17, viewing Figure 11, in a longitudinally extending slot 72 therein (see Figure 13). The rocking lever 70 passes through the I-beam and lies within a vertically extending slot 73 therein which intersects the longitudinally extending slot 72. Pivoted to the outer end of the lever 70 at 74 is a generally vertically extending link 75. Pivoted to the base 16 at 76 is a rigid L-shaped lever 77 to which the lower extremity of the link 75 is pivoted at 78. The base 16 is suitably cut out to accommodate the lever 77 and the lower outside flange of the left-hand I-beam 17, viewing Figure 11, is cut out at 79 to accommodate the link 75 (see also Figure 13). Likewise the upper inside flange of the same I-beam is cut out as indicated at 80 in Figure 12 to allow each of the positioning members 58 to pass therethrough. A treadle 81 is connected with the outer extremity of the lever 77 as shown in Figure 11. When the treadle 81 is depressed by the operator's foot the linkage shown moves the respective positioning members upwardly to their operative positions as shown in Figure 11 to position a facing member 3 as will presently be described. Release of the treadle 81 permits the positioning members 58 to drop down to inoperative position by gravity. The mechanism just described is shown in inoperative position in Figure 8.

Figures 17, 18:
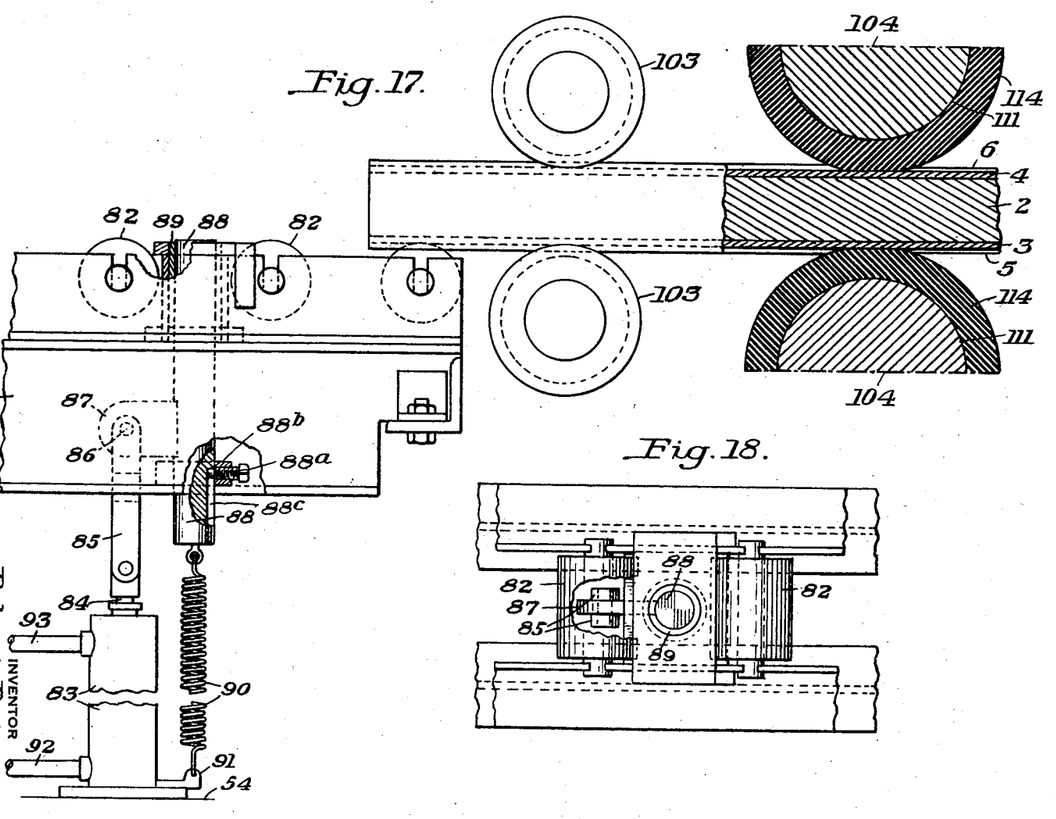
Figure 17 is a fragmentary view partially in elevation and partially in longitudinal cross section of a portion of the apparatus showing work being guided to the peining rolls by the feed rolls and acted on by the peining rolls.
Figure 18 is a fragmentary plan view of a portion of the structure shown in Figure 17.

Positioned forwardly of the rollers 15 is a series of cylindrical rollers 82 as shown in Figures 1 to 4, inclusive, 8 and 17. The rollers 82 receive the work from the rollers 15 as it advances toward the peining rolls. Mounted on the floor 54 below the rolls 82 is a cylinder 83 (Figures 2, 17 and 25) arranged with its axis vertical and containing a piston to which is connected a piston rod 84. A connecting rod 85 is connected to the piston rod and is also connected at 86 to a projection 87 of a stop pin 88 which is guided for generally vertical movement in a guide sleeve 89 mounted in the frame. A tension coil spring 90 connected with the lower end of the stop pin 88 and with a lug 91 connected with the outside of the cylinder 83 normally pulls the stop pin 88 downwardly. Downward movement of such pin is limited by a stop screw 88a mounted in a collar 88b carried by the frame and entering a slot 88c in the pin. Fluid connections 92 and 93 to the piston 83 are shown in Figures 17 and 25.

The pusher 37 and the stop pin 88 are fluid operated from the same source of pressure fluid. Referring to Figure 25, the source of pressure fluid may be a pump (not shown) from which leads a pipe 94. The pipe 94 enters a valve 95 having a rotatable valve element controlled by a handle 95a and to which are connected pipes 96 and 97 and an exhaust 98. The pipe 96 leads to branches 93 and 99. The branch 93 leads to the upper end of the cylinder 83 and the branch 99 leads to the rear end of the cylinder 55. The pipe 97 leads to branches 92 and 100. The branch 92 leads to the lower end of the cylinder 83 and the branch 100 leads to the forward end of the cylinder 55. When the source of pressure 94 is connected with the pipe 96 and the pipe 97 is connected with the exhaust 98, as indicated by the arrows in Figure 25, the pusher is pushed forwardly or toward the right and the stop pin 88 is moved downwardly by the action of the spring 90. When, however, the valve is turned so that pressure enters the pipe 97 and the pipe 96 is connected with the exhaust 98 the stop pin 88 moves up and the pusher is retracted toward the left. The fluid passing to and from the cylinder 55 is throttled through orifice plates 101, one of which is shown in Figure 24, so that the action of the pusher is slow and uniform. The orifice plates 101 are inserted into pipe connections 102 leading to the cylinder 55 as shown.

In alignment with the guideway comprising the rollers 11, 15 and 82 is a pair of guide rolls 103 followed by the peining rolls 104. The guide rolls 103 and the peining rolls 104 are mounted in opposed housings 105 and the respective rolls 103 and the respective rolls 104 may be adjusted in usual manner to vary the height of the roll pass therebetween. A runout table 106 having idler rollers 107 thereon receives the work as it passes forwardly from the peining rolls.

Figure 6:
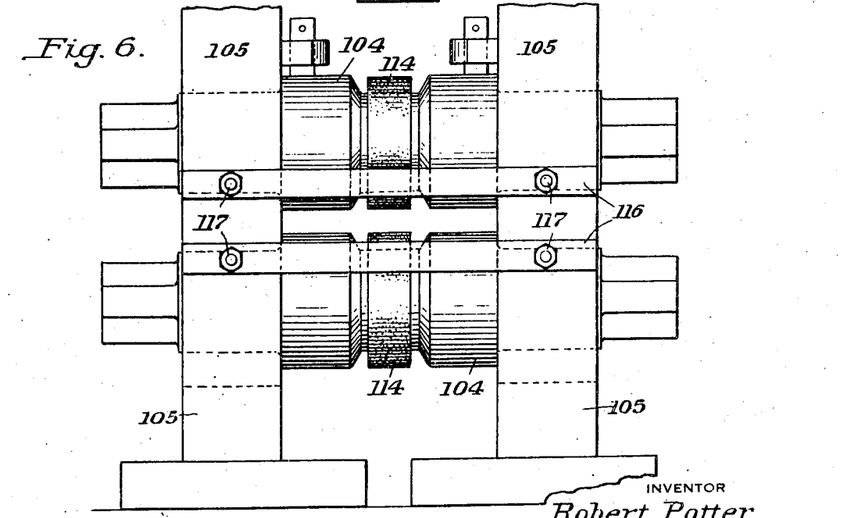
Figure 6 is an elevational view of the peining rolls and the mounting mechanism therefor looking in the direction opposite the direction of advance of the work.

I preferably provide extending between the housings 105 at the faces of the housings nearest the runout table 106 two rods 116 spaced one above the other as shown in Figures 2 and 6. These rods are bolted to the respective housings by bolts 117. They preferably have inclined central face portions 118 as shown in Figure 2, the upper of which is inclined toward the peining rolls and upwardly and the lower of which is inclined toward the peining rolls and downwardly. The vertical distance between the rods 116 is preferably slightly greater than the maximum height of the bimetallic billet as it emerges from the peining rolls. The billet passes between the rods, the inclined face portions 118 serving to properly guide the forward end of the billet if it should not pass directly between the rods. The function of the rods is to prevent the billet from twisting substantially about its longitudinal axis after the rear end of the billet has left the guide rolls 103. Slight clearance for the billet is provided between the rods 116 so that the billet may twist to a very slight or immaterial extent, but any substantial twisting is prevented by the rods. If a tendency toward twisting exists the corners of the billet will engage the upper and lower rods respectively, which will prevent substantial twisting. Rollers may, if desired, be substituted for the rods 116.

Figure 5:
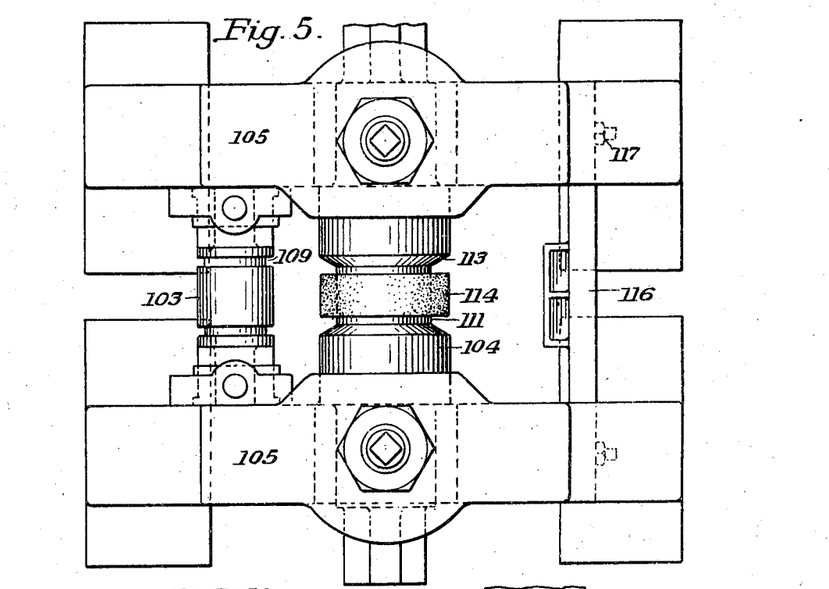
Figure 5 is a plan view of the guiding and peining rolls and the mounting mechanism therefor.
Figure 19:
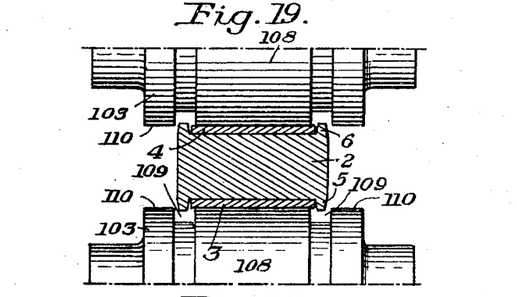
Figure 19 is a fragmentary elevational view showing the operation of the guide rolls on the work, the work being shown in transverse cross section.
Figure 20:
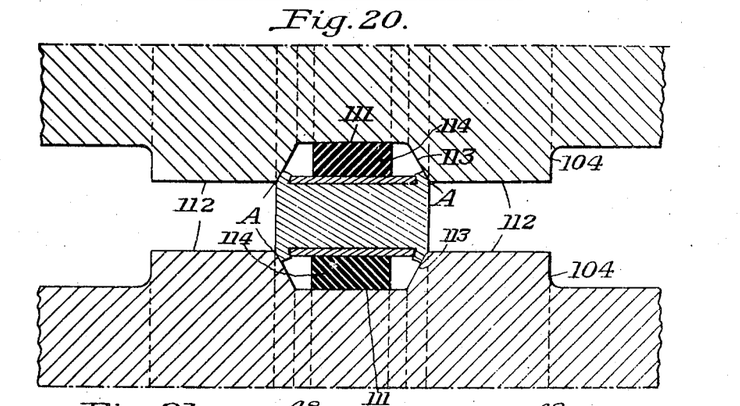
Figure 20 is a fragmentary transverse cross-sectional view showing the operation of the peining rolls on the work.

The form of the guide rolls 103 is shown in Figures 5, 17 and 19 and the relation of such rolls to the work is shown in Figures 17 and 19. The form of the peining rolls 104 is shown in Figures 5, 6, 17 and 20 and the relation of such rolls to the work is shown in Figures 17 and 20. The guide rolls 103 are not driven but are free to turn upon engagement with the moving work. The peining rolls 104 are driven, preferably at a speed slightly greater than the speed of advance of the pusher 37 so that when the pusher advances the work to the point at which the front end thereof is gripped by the driven peining rolls such rolls will carry the work forward relatively to the pusher and the pusher will become inoperative.

Each of the guide rolls 103 has a broad central cylindrical face portion 108 bounded by grooves 109. Outside the grooves 109 are projecting portions 110 which may assist in centering the work to the guide rolls as it enters between such rolls from the roller table guideway. The function of the guide rolls 103 is to insure proper alignment of the work as it is fed to the peining rolls and to press the billet components together. The face portions 108 of the guide rolls respectively engage the facings 3 and 4 and press the same firmly against the backing 2. However, the guide rolls 103 do not exert sufficient pressure to in any way deform the work except possibly to smooth out slight bends or warpage in the facing members. The flanges of the backing member 2 project slightly into the grooves 109 of the guide rolls 103 and have ample clearance therein as shown in Figure 10. If, however, the work tends to skew off toward one side or the other the flanges will engage with the inner edges of the roll face portions 110 to keep it in proper alignment.

The peining function is accomplished entirely by the peining rolls 104. These rolls are shown in cross section in Figure 20 and the work is shown as being engaged and peined thereby. Each peining roll has a reduced central face portion 111 and projecting face portions 112 on opposite sides thereof. Inclined operative or peining face portions 113 extend between the face portions 111 and 112. The portions 112 and 113 intersect at corners A. The transverse distance between the corners A of each of the peining rolls 104 is substantially equal to the transverse distance across the member 2 at the bases of transversely aligned flanges. The peining rolls are adjusted toward or away from each other until the corners A of the respective rolls are approximately as far apart as the thickness of the member 2 except for the flanges. This is shown in Figure 20. The inclined roll face portions 113 consequently are brought into engagement with the flanges 5 and 6 of the member 2 and deform or pein such flanges inwardly and slightly downwardly to engage the edges of the facing members 2 and 3 as shown in Figure 20.

Bands of rubber or rubber-like material 114 are preferably, although not always necessarily, applied to the recessed face portions 11 of the peining rolls 104 as shown in Figure 20. The bands 114 to all intents and purposes form integral parts of the respective peining rolls 104 but are relatively resilient since the other portions of the peining rolls are of metal. The thickness of the bands 114 is such that when the peining rolls are adjusted as above described the vertical distance between the opposed faces of the bands in the vertical center line of the peining mill is somewhat less than the thickness of the assembled billet components from the outer surface of the upper facing member to the outer surface of the lower facing member. Depending on the resilience of the rubber or other relatively resilient material used for the bands 114, the distance between their opposed faces will be greater or less, but such distance when no work is being acted upon by the peining rolls may be approximately equal to the thickness of the body portion of the member 2, that is, the vertical distance between the faces 7 and 8 thereof. Thus when the assembled billet components enter the peining rolls as shown in Figures 17 and 20 the bands are substantially compressed and exert considerable, although yielding, pressure upon the facings 3 and 4 to press and hold them in position against the backing 2. It is desirable that the facings be held firmly against the backing while the peining action is taking place. The bands 114 cooperate with the guide rolls 104 to straighten out slight bends or warpage in the facing members 3 and 4 and insure that they lie flat and smooth against the respective surfaces 7 and 8 of the member 2.

I shall now describe one mode of operation of the apparatus described above and one method of handling and joining components of a bimetallic billet. A number of backing members 2 are advanced on the rollers 9 from left to right, viewing Figure 1, until they strike the stop 10. At the time of their advance such members 2 are standing on end as are the three right-hand members 2 shown in Figure 9. An operator turns down the member 2 nearest the rolls 11 as shown in Figure 9 and then slides such member over the guide members 12 until it falls upon the rollers 11. By exercising a little care in manipulation the member 2 can be caused to come to rest on the rolls 11 with the flanges which were in engagement with the rollers 9, as shown in the case of the left-hand member 2 in Figure 9, projecting upwardly away from the rollers 11. Thus the entire member may be inspected between the time it enters on the rollers 9 and the time it is advanced on the rollers 11.

When the member 2 falls on the rollers 11 it is substantially centered thereon by the guide members 12 and the guide 13. At about the same time another operator takes one of the facing members 3 from the support 14 (see Figure 1) and places the same so as to rest on the upper extremities of the plates 26 and with its forward end in contact with the stop pin 88 which at such time is in raised or operative position. This operator depresses the treadle 81 which raises the positioning members 58 to the position shown in Figure 11. The purpose of these positioning members is to insure proper alignment of the facing member and also proper positioning thereof transversely of the guideway. The upwardly projecting positioning members cooperatively furnish a guide against which the left-hand edge of the facing member may be positioned as shown in Figure 11, the facing member being moved against the positioning members by hand. The treadle 81 is then released and the positioning members 58 move down to inoperative position, leaving the facing member properly aligned and centered on the tops of the plates 26.

With the member 2 disposed on the rollers 11 as above described and the facing member 3 positioned on the tops of the plates 26 as just described the respective members 2 and 3 are in substantial longitudinal alignment but with the upper surface of the member 3 very slightly below the level of the surface 7 of the member 2. The rollers 11 are then rotated to move the member 2 toward the right viewing Figures 1 and 2, or the member 2 may be pushed along by hand, in which case the rollers 11 may be idler rollers. In either event the member 2 moves toward the right relatively to the positioned member 3. As the member 2 thus moves toward the right, viewing Figures 1 and 2, it runs into the left hand face of the upper extremity of the pusher 37 which is disposed in its path. The movement of the member 2 forces the pusher 37 to turn in the clockwise direction about the axis 35 so that the pusher moves forwardly and downwardly out of the path of the member 2 which thereupon advances over top of the pusher until the end of the member 2 has cleared the pusher, whereupon the spring 41 returns the pusher to the position in which it is shown in Figures 2 and 4 ready to push the work forward.

As above mentioned, at the time the facing member 3 is positioned on the plates 26 as above described the stop pin 88 is in its upper or operative position in which it extends in the path of the work and the forward or right-hand end of the facing member 3 is positioned against the pin 88. When the member 2 is advanced as just described it moves forward until its forward end engages the pin 88. As the member 2 moves forward it rides on the face portions 23 of the rollers 15, the shoulders 25 positively guiding the member 2 and maintaining it in a straight line, as indicated in Figure 7. The plates 26 are adjusted to such a height that the facing member 3 is held approximately in contact with the member 2 as it thus advances so that the member 2 straddles the member 3 as shown in Figure 7 and moves forward while the member 3 remains stationary. The member 3 cannot advance due to any contact between it and the member 2 because such advance of the member 3 is prevented by the pin 88. The member 2 advances while straddling the member 3 until both of such members are in stationary position with their front ends abutting against the pin 88. At such time the operator takes another of the facing members from the support 14 and places the same on top of the member 2 between the flanges 6 and also with its front end engaging the pin 88. The thus assembled billet components are then ready to be advanced between the guiding and peining rolls.

When the pin 88 is up the piston in the cylinder 55 is toward the left viewing Figure 25 as hereinbefore explained. When the billet components are assembled as above explained with their forward ends against the pin 88 the valve 95 is turned to the position illustrated in Figure 25 whereupon the pin 88 is retracted downwardly out of the path of the work and the pusher 37 is moved forward.

The forward extremity 115 of the projection 42 engages the rear end of the lower facing member 3 while the surface 43 of the pusher engages the rear end of the member 2. The member 2 is preferably longer than the member 3 by a distance equal to the horizontal longitudinal distance between the extremity 115 and the surface 43 (Figure 4) so that members 2 and 3 are pushed forward without disturbing their relative positions as originally determined by the pin 88. When a pusher of the form shown in Figure 4 or of the form shown in Figures 21, 22 and 23 is employed it is not essential to use the pin 88 as the pusher automatically determines the relative longitudinal positions of the members 2 and 3 and it is not difficult to place the upper facing member 4 on the backing member 2 in a position corresponding to that of the lower facing member 3.

It is possible in some circumstances to dispense with the projection 42 of the pusher 37 and employ a pusher having a smooth work engaging face without any projection. This may be done when the friction between the members 2 and 3 is greater than the friction tending to hold the member 3 against forward movement with the member 2. In such case pressure upon the rear end of the member 2 will cause the assembled components to move forward together.

The form of pusher shown in Figures 21, 22 and 23 is designed to positively insure under any circumstances proper relative positioning of the members 2, 3 and 4 as they are advanced to the peining rolls. The member 2 is engaged by the surface portion 52 and the members 3 and 4 are respectively engaged by the lower and upper shoulders 49. The form of pusher shown in Figures 21, 22 and 23 is designed for use with facing members which are somewhat greater in length relatively to the backing member than is the case with respect to the facing members for use with which the pusher 37 is designed.

The pusher advances the work between the guide rolls 103 and the peining rolls 104 which cooperate therewith as above described to guide and work upon the assembled components and to pein down the flanges of the backing member 2 against the edges of the facing members 3 and 4 as shown in Figure 20. The thus fabricated billet is delivered from the peining rolls upon the table 106 whence it may be taken to the rolling mill for rolling into bimetallic strip.

While I have shown and described certain present preferred embodiments of the invention and certain present preferred methods of practicing the same it is to be distinctly understood that the invention is not limited thereto but may be otherwise variously embodied and practiced within the scope of the following claims.

I claim:

1. Apparatus for joining a flanged member and a member adapted to be held thereto by flange means of the first mentioned member comprising peining rolls between which the assembled members are adapted to be passed, at least one of said rolls having both rigid means for deforming a flange of the first mentioned member into holding position relative to said second mentioned member and facing means of yielding material for pressing said members together at opposed surfaces removed from said flange.

2. Peining means comprising a pair of cooperating rolls respectively having yielding face portions for squeezing work therebetween, at least one of such rolls having a metal face portion for engaging and peining a portion of the work.

3. Peining means for peining a flange of advancing work comprising cooperating guide rolls for guiding the work during its advance, at least one of said guide rolls having a recess for receiving said flange as the work advances, and peining rolls to which the work is guided by said guide rolls, the peining rolls respectively having resilient portions for squeezing the work therebetween, at least one of the peining rolls having a portion for engaging and peining said flange.

4. Apparatus for joining a member having opposed flanges and a member adapted to be held thereto by said flanges comprising supporting means for the second mentioned member, conveying means at opposite sides of said supporting means whereby the first mentioned member is movable parallel to the length of its flanges into cooperative relationship with the second mentioned member while straddling the second mentioned member and with said flanges in engagement with said conveying means and means for deforming said flanges into holding position relative to said second mentioned member.

5. Apparatus for joining a flanged member and a member adapted to be held thereto by flange means of the first mentioned member comprising a guideway upon which the second mentioned member is adapted to be positioned, means operable at the will of the operator for predeterminedly positioning laterally of the guideway said second mentioned member, the first mentioned member being movable along the guideway into cooperative relationship with the second mentioned member while thus positioned, the guideway having means for guiding the first mentioned member in said movement, the means for advancing said members together and deforming flange means of the first mentioned member into holding position relative to said second mentioned member.

6. Apparatus for joining a flanged member and a member adapted to be held thereto by flange means of the first mentioned member comprising a guideway upon which the second mentioned member is adapted to be positioned, positioning means movable within the guideway for predeterminedly positioning laterally of the guideway said second mentioned member, means operable by the operator for moving said positioning means, the first mentioned member being movable along the guideway into cooperative relationship with the second mentioned member, the guideway having means for guiding the first mentioned member in said movement, means for pressing together the assembled members and means for deforming flange means of the first mentioned member into holding position relative to said second mentioned member.

7. Apparatus for joining a member having opposed flanges and a member adapted to be held thereto by said flanges comprising a guideway having means for supporting said members including roller means having portions forming an anti-friction feed table receiving the first mentioned member disposed with the extremities of its flanges resting thereupon, the guideway also having opposed side guiding portions engaging the outer faces of the flanges of the first mentioned member whereby to laterally position the first mentioned member on the feed table, stop means mounted to assume operative position intersecting the guideway and inoperative position remote therefrom and adapted when in operative position to engage the forward end of the second mentioned member disposed on the supporting means while the first mentioned member advances along the guideway in position with the portion thereof intermediate its flanges opposed to the second mentioned member until the first mentioned member engages the stop means, means for moving the stop means to inoperative position and means for advancing together the thus relatively positioned members and deforming the flanges of the first mentioned member into holding position relatively to the second mentioned member.

8. Apparatus for joining a member having opposed flanges and a member adapted to be held thereto by said flanges comprising a guideway having means for supporting said members including stepped rollers each having a portion of relatively small diameter and a portion of relatively great diameter with a shoulder between said portions, the first mentioned portions of the rollers forming an anti-friction feed table receiving the first mentioned member disposed with the extremities of its flanges resting thereupon, the shoulders between the first mentioned portions and the second mentioned portions of the rollers engaging the outer faces of the flanges of the first mentioned member whereby to laterally position the first mentioned member on the feed table, stop means mounted to assume operative position intersecting the guideway and inoperative position remote therefrom and adapted when in operative position to engage the forward end of the second mentioned member disposed on the supporting means while the first mentioned member advances along the guideway in position with the portion thereof intermediate its flanges opposed to the second mentioned member until the first mentioned member engages the stop means, means for moving the stop means to inoperative position and means for advancing together the thus relatively positioned members and deforming the flanges of the first mentioned member into holding position relatively to the second mentioned member.

9. Apparatus for joining a member having opposed flanges and a member adapted to be held thereto by said flanges comprising a guideway having means for supporting said members including roller means having portions forming an anti-friction feed table receiving the first mentioned member disposed with the extremities of its flanges resting thereupon, the guideway also having opposed side guiding portions engaging the outer faces of the flanges of the first mentioned member whereby to laterally position the first mentioned member on the feed table, stop means mounted to assume operative position intersecting the guideway and inoperative position remote therefrom and adapted when in operative position to engage the forward end of the second mentioned member disposed on the supporting means while the first mentioned member advances along the guideway in position with the portion thereof intermediate its flanges opposed to the second mentioned member until the first mentioned member engages the stop means, means for laterally positioning the second mentioned member on the guideway prior to said advance of the first mentioned member to insure that upon said advance of the first mentioned member it will assume relatively to the second mentioned member said position with the portion thereof intermediate its flanges opposed to the second mentioned member, means for moving the stop means to inoperative position and means for advancing together the thus relatively positioned members and deforming the flanges of the first mentioned member into holding position relatively to the second mentioned member.

10. Apparatus for joining a member having opposed flanges and a member adapted to be held thereto by said flanges comprising a guideway having means for supporting said members including spaced apart sets of aligned rollers having portions forming an anti-friction feed table receiving the first mentioned member disposed with the extremities of its flanges resting thereupon, the guideway also having opposed side guiding portions engaging the outer faces of the flanges of the first mentioned member whereby to laterally position the first mentioned member on the feed table, stop means mounted to assume operative position intersecting the guideway and inoperative position remote therefrom and adapted when in operative position to engage the forward end of the second mentioned member disposed on the supporting means while the first mentioned member advances along the guideway in position with the portion thereof intermediate its flanges opposed to the second mentioned member until the first mentioned member engages the stop means, means for moving the stop means to inoperative position, means for deforming the flanges of the first mentioned member into holding position relatively to the second mentioned member and a pusher operable between the spaced apart sets of aligned rollers for pushing the members together past the inoperative stop means to advance the same toward the deforming means.

11. Apparatus for joining a member having opposed flanges and a member adapted to be held thereto by said flanges comprising a guideway having means for supporting said members including spaced apart sets of aligned stepped rollers each having a portion of relatively small diameter and a portion of relatively great diameter with a shoulder between said portions, the first mentioned portions of the rollers forming an anti-friction feed table receiving the first mentioned member disposed with the extremities of its flanges resting thereupon, the shoulders between the first mentioned portions and the second mentioned portions of the rollers engaging the outer faces of the flanges of the first mentioned member whereby to laterally position the first mentioned member on the feed table, stop means mounted to assume operative position intersecting the guideway and inoperative position remote therefrom and adapted when in operative position to engage the forward end of the second mentioned member disposed on the supporting means while the first mentioned member advances along the guideway in position with the portion thereof intermediate its flanges opposed to the second mentioned member until the first mentioned member engages the stop means, means for laterally positioning the second mentioned member on the guideway prior to said advance of the first mentioned member to insure that upon said advance of the first mentioned member it will assume relatively to the second mentioned member said position with the portion thereof intermediate its flanges opposed to the second mentioned member, means for moving the stop means to inoperative position means for deforming the flanges of the first mentioned member into holding position relatively to the second mentioned member and a pusher operable between the spaced apart sets of aligned stepped rollers for pushing the members together past the inoperative stop means to advance the same toward the deforming means.

ROBERT POTTER.

REFERENCES CITED

The following references are of record in the file of this patent:

UNITED STATES PATENTS

| Number | Name | Date |
|---|---|---|
| 102,722 | Shepard | May 3, 1870 |
| 164,379 | Kloman | June 15, 1875 |
| 512,207 | Morrison | Jan. 2, 1894 |
| 617,363 | Skogse | Jan. 10, 1899 |
| 646,469 | Sleeper | Apr. 3, 1900 |
| 685,758 | Griffith | Nov. 5, 1901 |
| 723,834 | Cooper | Mar. 31, 1902 |
| 826,813 | Oberschultl | Oct. 13, 1931 |
| 857,799 | Gangelhoff | June 25, 1907 |
| 880,119 | Blakeslee | Feb. 25, 1908 |
| 887,995 | Beyrle | May 19, 1908 |
| 907,858 | Nessler | Dec. 29, 1908 |
| 925,661 | Searle | June 22, 1909 |
| 1,025,173 | Wegner | May 7, 1912 |
| 1,255,666 | Theiss | Feb. 5, 1918 |
| 1,267,379 | Cook | May 28, 1918 |
| 1,295,195 | Parker | Feb. 25, 1919 |
| 1,302,563 | Klocke | May 6, 1919 |
| 1,345,143 | Day | June 29, 1920 |
| 1,423,098 | Ferguson | July 18, 1922 |
| 1,492,533 | Poole | Apr. 29, 1924 |
| 1,503,862 | Sutherland | Aug. 5, 1924 |
| 1,646,533 | Hewitt | Oct. 25, 1927 |
| 1,664,677 | Grebe | Apr. 3, 1928 |
| 1,694,850 | Galvin | Dec. 11, 1928 |
| 1,726,418 | Aldrich | Aug. 27, 1929 |
| 1,736,331 | Townsend | Nov. 19, 1929 |
| 1,805,976 | Candee | May 19, 1931 |
| 1,828,619 | Pugh | Oct. 20, 1931 |
| 1,843,064 | Chesney | Jan. 26, 1932 |
| 1,871,701 | Jones | Aug. 16, 1932 |
| 1,930,562 | Krueger | Oct. 17, 1933 |
| 1,955,072 | Jordan | Apr. 17, 1934 |
| 2,041,004 | Levan | May 19, 1936 |
| 2,059,177 | Ohrn | Oct. 27, 1936 |
| 2,063,183 | Mudd | Dec. 8, 1936 |
| 2,131,057 | Lewis | Sept. 27, 1938 |
| 2,209,724 | Bodkin | July 30, 1940 |
| 2,234,991 | Todhunter | Mar. 18, 1941 |
| 2,242,532 | Marx | May 20, 1941 |
| 2,272,502 | Bauer | Feb. 10, 1942 |
| 2,338,678 | Wilson | Jan. 4, 1944 |

FOREIGN PATENTS

| Number | Country | Date |
|---|---|---|
| 12,230 | Australia | May 2, 1933 |
| 163,234 | Germany | Mar. 10, 1904 |